(12) United States Patent
Mayerle

(10) Patent No.: US 12,010,946 B2
(45) Date of Patent: Jun. 18, 2024

(54) COMBINE HARVESTER RESIDUE SPREADER FIN SHAPED TO INCREASE SPREADING ACTION

(71) Applicant: Tritana Intellectual Property Ltd., Saskatoon (CA)

(72) Inventor: Dean Mayerle, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 34 days.

(21) Appl. No.: 17/693,661

(22) Filed: Mar. 14, 2022

(65) Prior Publication Data

US 2022/0312675 A1 Oct. 6, 2022

Related U.S. Application Data

(60) Provisional application No. 63/171,193, filed on Apr. 6, 2021.

(51) Int. Cl.
*A01D 41/12* (2006.01)
*A01F 29/12* (2006.01)

(52) U.S. Cl.
CPC .......... *A01D 41/1243* (2013.01); *A01F 29/12* (2013.01)

(58) Field of Classification Search
CPC .............................. A01F 29/12; A01D 41/1243
See application file for complete search history.

(56) References Cited

U.S. PATENT DOCUMENTS

| | | | |
|---|---|---|---|
| 3,350,017 A | 10/1967 | Bettendorf et al. | |
| 6,331,142 B1 | 12/2001 | Bischoff | |
| 6,939,221 B1 * | 9/2005 | Redekop | A01D 41/1243 460/111 |
| 2005/0245301 A1 * | 11/2005 | Redekop | A01D 41/1243 460/112 |
| 2006/0073860 A1 * | 4/2006 | Redekop | A01D 41/1243 460/112 |
| 2008/0188275 A1 * | 8/2008 | Mayerle | A01D 41/1243 460/111 |

(Continued)

FOREIGN PATENT DOCUMENTS

| | | | | |
|---|---|---|---|---|
| CA | 2465142 A1 * | 10/2005 | ......... | A01D 41/1243 |
| EP | 1374663 A1 * | 1/2004 | ......... | A01D 41/1243 |

(Continued)

*Primary Examiner* — Adam J Behrens
*Assistant Examiner* — Ashley A Kaercher
(74) *Attorney, Agent, or Firm* — Adrian D. Battison; Ade & Company Inc.; Ryan W. Dupuis

(57) ABSTRACT

A residue management system of a combine harvester includes a tailboard with a guide surface and guide fins for spreading of the residue to the sides. At least one of the fins includes a leading portion which is smoothly concavely curved up to a trailing portion which intersects with the leading portion at a change in direction or defined bend in the sheet metal. The trailing portion thus extends across and intersects with a path of the residue as it passes along the concave side surface at the leading portion and leaves the end of the leading portion to apply increased pressure on the stream and thus increase the spreading action. The trailing edge of the trailing portion is also inclined to a line across the trailing portion at right angles to the tailboard surface which causes the residue to leave the trailing edge at different angles.

14 Claims, 6 Drawing Sheets

(56) References Cited

U.S. PATENT DOCUMENTS

2018/0070534 A1* 3/2018 Mayerle .................. A01F 12/40
2022/0295705 A1* 9/2022 Mayerle ............. A01D 41/1243
2022/0312675 A1* 10/2022 Mayerle ............. A01D 41/1243

FOREIGN PATENT DOCUMENTS

| EP | 2225929 A1 * | 9/2010 | ......... A01D 41/1243 |
|---|---|---|---|
| EP | 3039956 A1 * | 7/2016 | ......... A01D 41/1243 |
| WO | WO-2005022980 A2 * | 3/2005 | ......... A01D 41/1243 |
| WO | WO-2005102027 A1 * | 11/2005 | ......... A01D 41/1243 |

* cited by examiner

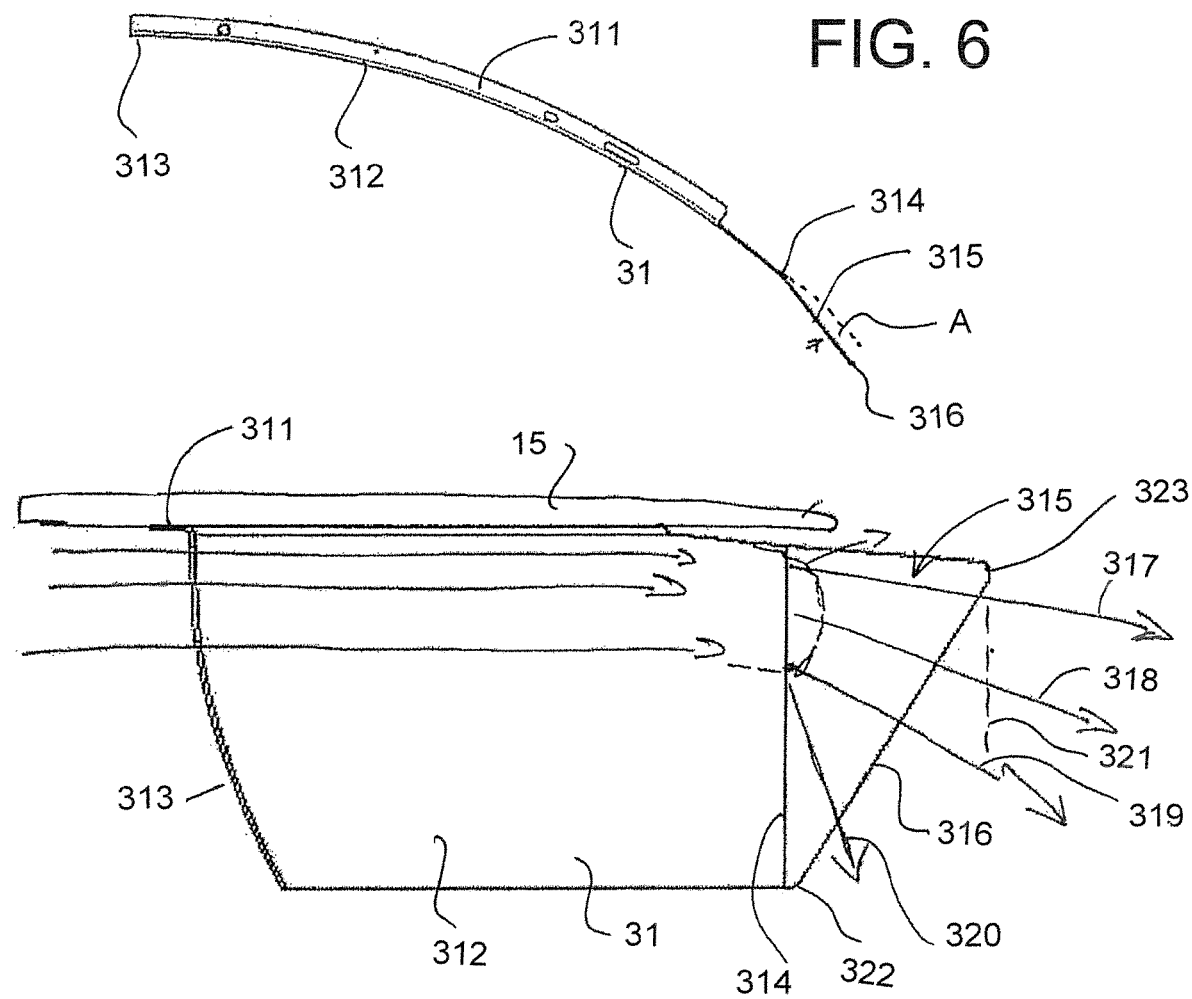

COMBINE HARVESTER RESIDUE SPREADER FIN SHAPED TO INCREASE SPREADING ACTION

This invention relates to a tailboard spreader for residue from a combine harvester with an improved vane or fin design for guiding the crop material in the spreading action to provide an improved spreading action.

The present invention relates to a construction of a tailboard with one or more fins or vanes projecting outwardly from a surface of the tailboard for engaging and guiding the residue material as the material flows across the tailboard in an air stream.

The airstream can be generated by a chopper rotor in a housing to which the tailboard is attached or by a rotor forming part of the combine harvester. As an alternative, the airstream can be generated at least in part by other components which create an airstream onto the tailboard including weed seed destruction units and including rotary fans or spreaders.

BACKGROUND OF THE INVENTION

In U.S. Pat. No. 6,840,854 (Redekop) issued Jan. 11, 2005 is disclosed a straw chopper and discharge apparatus for a combine harvester where a rotor carrying a series of flail blades is mounted for rotation about a horizontal axis at the rear of the combine harvester so that the blades sweep around a housing of the apparatus to carry the straw and optionally the chaff from an inlet opening of the housing to a discharge opening of the housing. A tail board is provided at the discharge opening with a series of fins so that the material discharged from the opening at high speed engages onto the board and the fins thereon for spreading. This patent in particular provides an improved arrangement of the blades for generating a higher velocity in the air and material being discharged.

In U.S. Pat. No. 6,939,221 (Redekop et al) issued Sep. 6, 2005 is disclosed an arrangement of the tail board which is formed in two separate side by side sections allowing independent adjustment of the two sections for enhanced spreading action.

In U.S. Pat. No. 7,736,218 (Mayerle) is disclosed a wide spread fin design where an outer one of the fins is designed and shaped to channel the air produced from a chopping rotor mounted fan blade and accelerate the residue into a wide spread pattern.

In U.S. Pat. No. 10,212,882 (Mayerle) a vane tailboard is used in combination with a powered disc spreader. Thus the airstream can be generated in this arrangement partly or wholly by a rotary chopper and partly or wholly by the powered disc type spreader. For example, the vane system may be used when dry conditions exist and the powered disc system may be used when wet or green conditions exist.

The disclosure of each of the above patents is incorporated herein by reference.

One of the primary requirements of residue management systems is that they evenly distribute residue over a combine's entire cutting width. Often a straw chopper or spreading mechanism will be able to cover the cutting width of the combine, however equally important is the consistency of the spread.

Variables such as a field's terrain, cutting height and wind direction alter the final placement of the residue. The straight cut headers mounted on the front end of today's harvesters are increasing in width due to the release of larger and more powerful combines. Currently the largest straight cut headers are 60 feet wide while some operators also utilize a pick-up header to gather in a swath that is cut from a pass as wide as 60 feet. Most farmers want the spread width of the residue to match of width of cut, while maintaining an even distribution across the field, regardless of the external variables that may affect it.

Current methods to maintain even distribution with a wide spread are typically limited to a 45 feet width. Uncontrollable variables such as the wind speed and direction can significantly reduce both the spread width and an even distribution.

All choppers with simple vane tailboards work well when crop residue is dry and brittle. Flow from the tailboard and each fin disperses in an even spread pattern when residue is dry. When the grain is ripe and ready to harvest but the plant stalk remains green this often results in poor spreading action leading to striping of the residue in the field. In this case, the residue flows off each fin and does not disperse properly leaving rows or stripes of green chopped residue with very uneven distribution.

These problems are exacerbated by increases in header width thus requiring an even better spreading action with even distribution to avoid problems with seeding and growth in subsequent seasons.

Even using the significant improvements set out in the above patents some difficulties remain with the existing technology in that the current device has a reduced ability to significantly propel straw from a chopper against a strong wind. The current machine technology will only spread 10-12 feet against a 10 mph wind.

A powered disc tailboard was developed to solve the problems of a narrow residue stream in green conditions. However these spreaders consume much more power and do not work well with dry residue. When residue is dry these powered spinners are not able to throw the residue properly leaving outer heavy rows of material and a poor distribution pattern. It is nearly impossible to get an even spread from a spinning disc alone.

To solve problems with a powered disc's spreading width and unevenness more complex powered tailboard systems were developed with moving walls and deflectors. These do a very good job but they are very costly, utilize a lot of power and are prone to failure after several years due to the wear on the high number of components.

Most companies have several residue management systems available for their combines and have limited their vane or fin type tailboards to the narrowest widths. They have stopped development of the vane tailboard system as they focus on the powered disc spreader solution for their largest combines. The present applicant remains focused on the improvement of the simple, low cost, wide spread vane tailboard.

SUMMARY OF THE INVENTION

According to the invention there is provided a discharge apparatus for spreading residue from a combine harvester comprising:

a tailboard across a tailboard surface of which the residue is directed;

at least one guide fin extending outwardly from the tailboard surface so that the residue engages one side surface of the guide fin as it passes over the tailboard surface;

said at least one guide fin having a leading surface portion along which the residue passes, a trailing portion along which the residue passes after the residue leaves the leading portion and a trailing edge of the trailing portion spaced downstream of the leading portion from which the residue leaves the guide fin for spreading;

the trailing portion intersecting with the leading portion at a change in direction where the side surface at the trailing portion is arranged at an angle greater than 0 degrees to the side surface at the end of the leading portion;

the trailing portion thus extending across and intersecting with a path of the residue as it passes along the concave side surface at the leading portion and leaves the end of the leading portion.

In many cases, the leading portion is curved along at least part of its length. In this way the side surface at the leading portion can be at least partly concave. However the same arrangement can also be used with fins which are not curved so that the leading portion is straight but is angled so that the crop material runs along one side surface.

Preferably in one embodiment, the trailing portion is planar. However it may also have some curvature but of course as defined above it cannot follow the curvature of the leading portion as there must be a distinct change of direction on the stream of residue passing from the leading section over the change of direction onto the trailing section.

Preferably in one embodiment, the fin is formed of sheet metal and the change in direction between the leading and trailing portions is defined by a defined bend in the sheet metal.

Preferably in one embodiment, the change of direction lies in a line so that the defined bend lies along a line substantially at right angles to the path of residue along the leading portion. That is, the defined bend lies along a line substantially across the leading portion at right angles to the tailboard surface.

Preferably in one embodiment, the angle at the change in direction lies in the range greater than 0 degrees up to 45 degrees and more preferably in the range 5 degrees up to 30 degrees. This angle is sufficient to cause increased pressure on the stream as it passes the change in direction forcing the stream to spread across the width of the fin so that the residue leaves the trailing edge with an increased divergence in the spread pattern.

Preferably in one embodiment, in order to further increase the spread of the residue as it leaves the trailing edge, the trailing edge includes at least a portion which is inclined to a line across the trailing portion at right angles to the tailboard surface. More preferably the trailing edge lies in a straight line inclined to the line across the trailing portion. In this way the spreading of the stream across the width of the trailing portion causes the residue to discharge at different locations across the trailing edge to improve the distribution in the spread pattern. To obtain the best effect, preferably the trailing edge of the trailing portion is inclined so that an end of the trailing edge remote from the tailboard surface is upstream of an end of the trailing edge at the tailboard surface and so that an end of the trailing edge remote from the tailboard surface is closely adjacent the change in direction so that the trailing portion is substantially triangular.

Preferably in one embodiment, wherein the leading portion is smoothly curved so as to have no instant changes in direction and may have a constant curvature. Thus the stream runs smoothly over the leading portion of the fin until it reaches the sharp change in direction at the bend which causes a change in pressure on the trailing portion of the surface.

Preferably in one embodiment, the residue first engages the fin at a leading edge of the leading portion so that the side surface of the whole of the fin from the leading edge up to the change in direction at the trailing portion is smoothly curved to generate a smooth stream to encounter the change in direction.

Preferably the fin lies at right angles to the tailboard so that lines across the leading portion and the trailing portion lie at right angles to the tailboard. However other angles are possible.

Objectives of the arrangement described and shown herein therefore are:
  to create a wide spread, even distribution tailboard and fin system to match a wide spread, high air velocity chopper to maintain the fan end rotor generated energy;
  to utilize chopper rotor generated air velocity to better accelerate residue while utilizing a vane tailboard system to transition the residue into a wide spread while maintaining even distribution;
  to utilize simplified and cost reduced methods to increase spread velocity while creating even distribution.

In general, therefore, a straw chopper is provided on a combine harvester with the objective of providing a wide even spread. The straw chopper includes a rotor with fan blades mounted to the rotor for generating a high air velocity. The chopper includes a discharge tailboard with several fins for directing the chopped residue in an even spread pattern. The outer fins on the tailboard include at least some fins for directing and mixing the rotor generated air velocity with the residue stream. The fins are oriented for directing the air velocity and maintaining the air velocity to provide a good mixing of air and residue.

Most of the vanes, and particularly those toward the sides from which the residue must be spread the widest, include an initial curved section to maintain the rotor generated air velocity, with a bend or direction change at the rear of the fin. Typically, the high velocity residue runs in a narrow stream on each fin, often within 1 inch from the bottom surface of the tailboard. The direction change at the rear of the fin, which is accomplished with as little as a 10 degree bend, causes the high velocity residue stream to spread out and disperse all while not releasing any air velocity. The air velocity or pressure continues to move the material that is not spread out on the fin in a much wider band across the height of the fin, often in a 2 to 4 inch band. The rear of the fin at the trailing edge is cut at an angle to bottom of the tailboard so that there are multiple release points or angles of trajectory from the same fin depending on the distance down from the tailboard bottom that the material is running.

Thus, the air flow generated by the rotor accelerates the residue to the highest possible velocity. The curvature of the fin maintains that velocity until a small disruption at the change in direction is encountered. The disruption causes a widening of the residue stream while maintaining the velocity and the rear edge of the fin allows multiple angles of trajectories leaving the residue in the widest most even spread pattern.

BRIEF DESCRIPTION OF THE DRAWINGS

One embodiment of the invention will now be described in conjunction with the accompanying drawings in which:

FIG. 6 is a top plan view of one guide fins showing the inclined rear portion in plan.

FIG. 7 is a side elevational view of the guide fin of FIG. 6 showing the stream of residue passing over the front curved portion of the tin and onto the inclined rear portion.

In the drawings like characters of reference indicate corresponding parts in the different figures.

DETAILED DESCRIPTION

Figure 1:
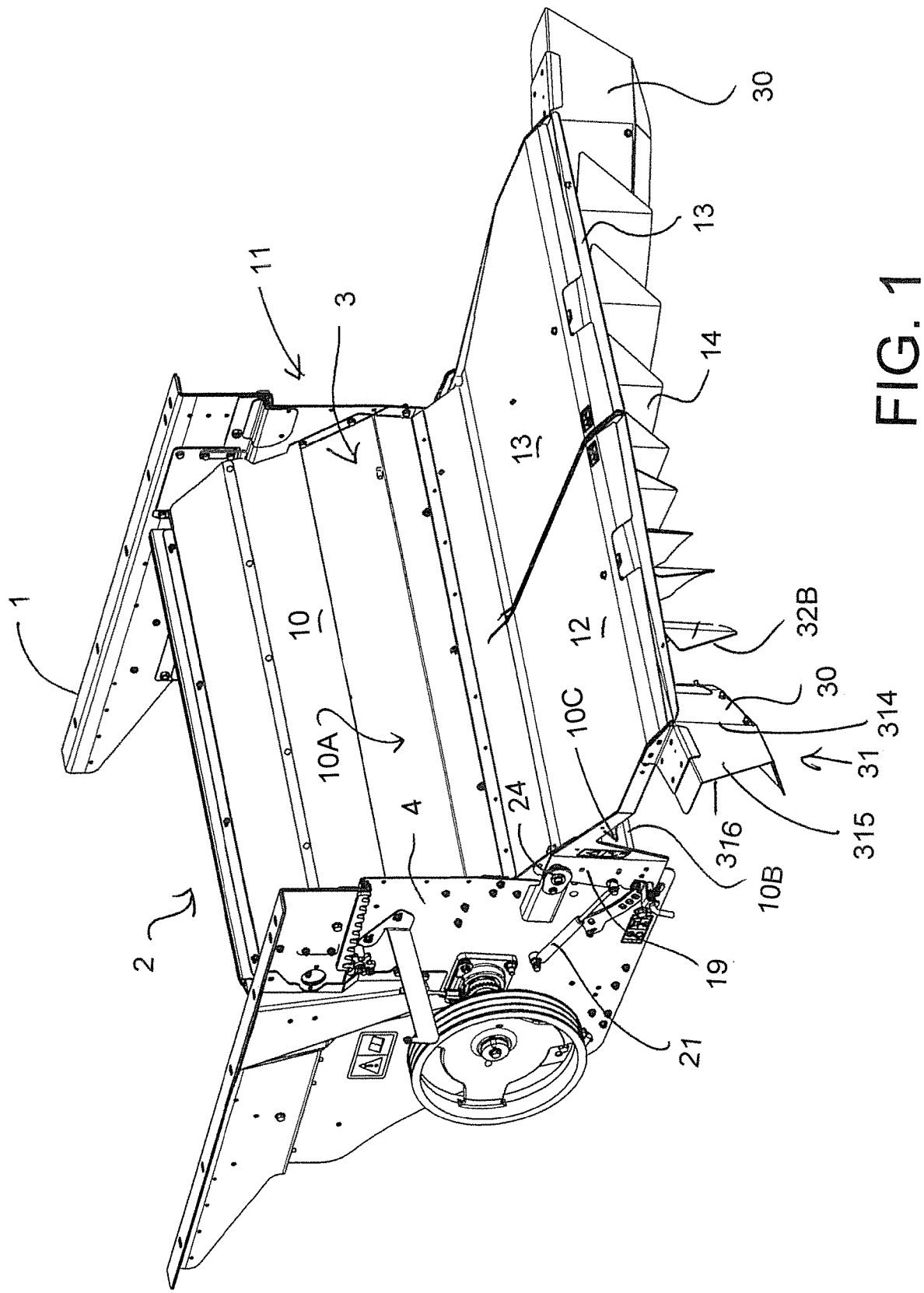
FIG. 1 is an isometric view of a rear section of a straw chopping and spreading arrangement for mounting on a combine harvester in accordance with the present invention.

A combine harvester is shown in the above-mentioned US patents of the present applicant. This comprises a combine harvester housing mounted on ground wheels for transport over a ground in conventional manner. The combine harvester is not shown since many different designs are available and well known to one skilled in the art. The combine harvester includes a straw separation section and a sieve section. Again these elements are conventional and provide arrangements for separation of the straw from the crop material allowing the seed material to fall through to the sieve at which seeds are separated from the seed material leaving the chaff or other lighter materials on top of the sieve to be carried away from the sieve by an air flow through the sieve as is well known.

The rear of the combine is provided is a rear hood into which air from the straw separation system and the sieves enters and into which straw is discharged rearwardly for and is guided by guide wall and by an operable guide panel in the hood section into a chopper and spreader generally indicated at 11.

This arrangement is well known and commercial products are readily available from Redekop Manufacturing and other manufacturers of straw choppers of this type.

The chopper has a horizontal upper mounting flange 1 which attaches to a corresponding bottom flange of the hood of the combine. This forms a rectangular open mouth at the top of the chopper which corresponds in shape to the rectangular lower opening of the hood so that all material discharging from the guide walls falls into the upper part of the housing and enters the inlet 2 of the chopper. The housing can also receive material from the sieves including the chaff and any non-grain material using known transfer devices (not shown).

The chopper comprises a housing 3 attached to the top mounting flange and depending therefrom and defined by side walls 4 at opposite sides of the hood and generally co-planar therewith. Bridging the side walls 4 is provided a bottom wall 5 and a top wall 6 which extend across the width of the chopper and form a generally cylindrical containing surface for receiving the chopper rotor. The rotor includes a hub with a plurality of radially extending flails or blades carried on the rotor for rotation therewith around the axis of the rotor which is arranged across the width of the chopper.

The top wall and the bottom wall define at the upper part of the housing the inlet 2 into which the straw can be guided from the hood. The chaff may be carried from the end of the sieve over the space between the end of the sieve and the front edge of the bottom wall 6 so as to carry the chaff in the air stream from the sieve over the plate and into the opening 2.

The top wall includes a generally vertical portion 10 which extends downwardly from the top flange 1 to the top of the rotor. The top wall 5 further includes a curved section 10A which extends around the top of the rotor to a rear edge 10B which defines the top edge of the rear discharge opening 10C through which the material exits in the stream of air and chopped materials generated by the rotation of the rotor within the housing.

The chopper can be configured with a left 12 and a right 13 tailboard as known in U.S. Pat. No. 6,939,221. Each tailboard incorporates six fins 14 that pivot about front mounting holes and can slide along a back slot to a required location where it is fixed by a locating screw. This tailboard has two locations for a leading edge thus defining a first leading edge fin placement and a second placement for cooperation with the common rear slots. The first fin placement is used for a high air velocity rotor and optimizes the product spread on a wide spread pattern. The second placement pattern is utilized with a traditional rotor most often used with narrow spread aggressive cutting chopper having low air velocities.

As shown in more detail in the above patent, the left and right tailboards are mounted to the straw chopper 11 with side mount plates 19. The tailboard's angular positioned is fixed with a spring-loaded pin in a slot on each side of the combine. A gas spring 21 on each side of the housing counter balances the weight of the tailboard allowing the operator to easily adjust each of the tailboard positions.

The tailboards pivot on a common axis. The axis is defined by the pivot 24 in each side plate and the center pivot. Once each assembly is attached to the chopper each tailboard is fully adjustable independent of each other.

The present invention is primarily concerned with the construction and arrangement of the fins of the tailboard 13, 14. It will be appreciated that a common tailboard can also be used in this current arrangement.

As is well known conventional fins or guide members are arranged with a leading edge adjacent the front of the tailboard so that the crop engaging onto the main surface of the tailboard also engages the side surfaces or guide surfaces of the fins adjacent the leading edge. The fins each extend rearwardly from the leading edge to a trailing edge adjacent the rear edge of the tailboard. Each of the fins has a shape which is preferably generally curved so as to define a contact side which is the concave side of the fin with the curvature carrying the fin toward the side edge of the tailboard. Thus the crop material is carried by the fins as the crop material moves rearwardly of the tailboard on the inside surface of the concave fin so that the material is moved outwardly to be discharged in a spread pattern rearwardly and to the sides of the tailboard. The tailboard thus defines a series of guide surface portions between the fins with each fin acting as a guide member relative to the respective guide surface portion.

Figure 3:
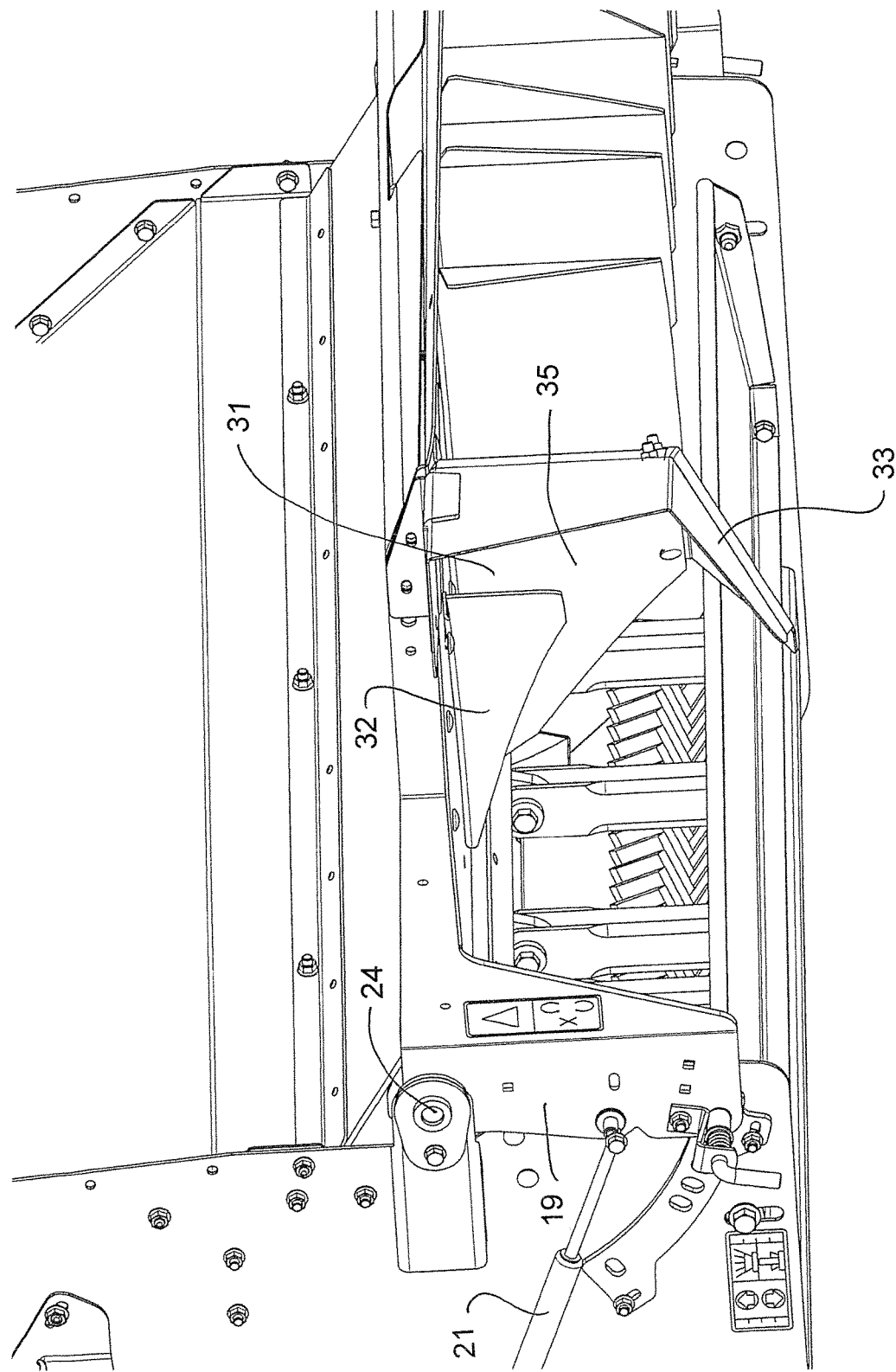
FIG. 3 is an isometric view of the tailboard of FIG. 1 from the rear corner showing the construction of the outermost guide fin.

In the present arrangement, the fins are modified so as to provide an additional functionality with the outermost pair of fins modified with a more complex structure and arrangement. Thus, referring to FIGS. 3 and 4, the inner fins include an additional feature while the outermost pair of fins indicated at 30 define a first fin which is indicated at 32 and extends from a leading edge at or adjacent the front edge of the tailboard 13 to a trailing edge 32A rearward of the leading edge but forward of the rear edge of the tailboard. The fin includes an inclined lower surface 32B so that the fin commences at zero height and gradually increases in height to the trailing edge 32A. In this way any crop material engaging the lower edge 32B can slide off that edge as the crop material moves rearwardly in the airstream.

The next adjacent fin is modified to include a second part generally indicated at 31. This fin part 31 is made up of two sheets 33 and 35 where the first sheet 35 forms the main body of the fin and the sheet 33 forms a second part attached to the main body of the fin and defining a generally channel shaped portion.

Figure 4:
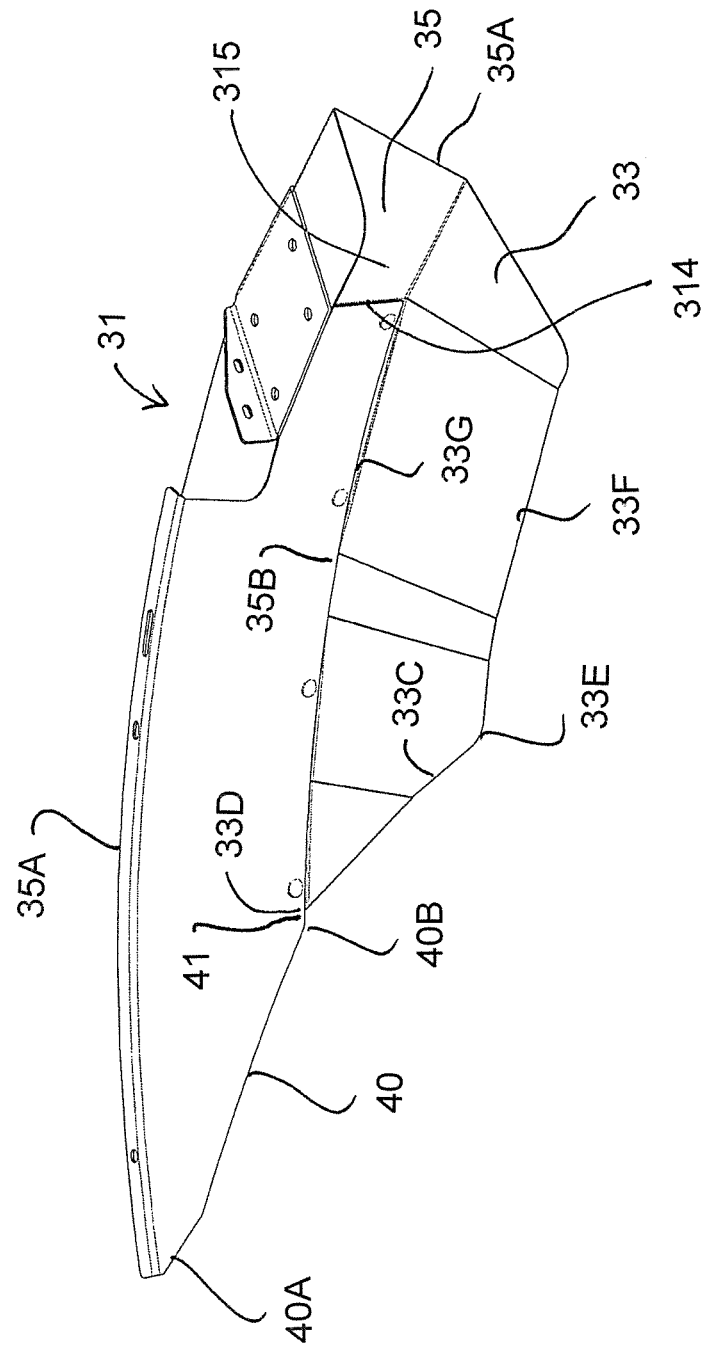
FIG. 4 is an isometric view from the bottom of one of the fins of the tailboard of FIG. 1.

The sheet 35 as shown in FIG. 4 has a top flange 35A at the top edge for bolting to the underside of the tailboard at the guide surface portion of the tailboard using the mountings previously described. The sheet 35 when mounted by the flange 35A extends at right angles to the surface of the tailboard. The sheet or main body 35 of the fin extends from a leading edge 40 rearwardly of the tailboard to a trailing edge 35A located at the rear of the tailboard adjacent one side. The sheet 35 has a bottom edge 35B which is parallel to the flange 35A and the top edge of the sheet 35. The leading edge 40 commences at a front end 40A and extends rearwardly while increasing in height to a trailing end 40B of the leading edge 40. Again the inclined leading edge 40 commencing at zero height allows the crop material to slide over this leading edge to be released from the fin should any crop material be trapped around that leading edge. Thus some of the crop slides along the sheet 35 along the concave side so as to be guided thereby in the spreading action.

At the bottom edge 35B of the sheet 35 is attached the second sheet 33. The sheet 33 has a mounting flange 33A at its side edge. The mounting flange 33A is arranged to lie along the outside surface of the sheet 35 at the lower edge 35B so as to be bolted thereto by attachment bolts 100. The flange 33A is arranged at an angle to the main body of the sheet 33 so that the sheet 33 is inclined from the lower edge 35B in a direction downwardly from the lower edge and to the side of the sheet 35 which is the concave side.

The angle of the sheet 33 to the sheet 35 is of the order of 120 degrees but the angle can vary between 90 degrees and approximately 150 degrees.

As shown in FIG. 4, each of the sheets 33 and 35 is curved in bottom plan view so that the adjoining edges at the side edges of the sheet 33 are also curved. The width of the sheet 33 is substantially constant along its length so that the edges are equidistantly spaced along its length from the sheet 35. In cross section the sheets are flat so as to define a channel member with the sheet 33 at the base and the sheet 35 upstanding from that base and with the angle between the sheets of the order of 120 degrees as previously stated. The sheet 35 is directly attached to the underside of the tail board so as to extend at right angles to that surface. Thus the sheet 34 is inclined toward the surface of the tail board. However the lower edge 33B of the sheet 33 is spaced downwardly from the surface of the tailboard so as to allow any crop material to enter the space therebetween to be channeled by the curved fin defined by these two sheets including the main body 35 and the additional sheets 33.

As previously stated the sheet 35 has a leading edge 40 extending from the end 40A to the end 40B. The sheet 33 has a leading edge 33C extending from an end 33D to a lower end 33E. Again the edge 33C is inclined rearwardly. The sheet 33 thus has an outer edge 33F which is considerably shorter than the inner edge 33G which is in turn considerably shorter than the edge 35E of the sheet 35. Sheet 33 acts to confine air and flowing materials into the channel which is defined on the concave side of the sheet 35.

Referring again to FIG. 4, the leading edge 40 of the sheet 35 terminates at the point 40B where it joins the outer edge of the sheet 35. The leading edge 33C has its inner end 33D spaced rearwardly from the end 40B of the leading edge 40. This forms a recessed portion 41 ensuring that any crop material flowing over the leading 40 is released from the leading edge 40 before it engages the leading edge 33C. This ensures that there is no shoulder or notch against which the crop material can engage to inhibit the free flow of the material over this edge. It will be appreciated that some crop material may fold over the leading edge in its movement rearwardly from the discharge opening onto the tailboard surface. It is necessary or highly desirable to ensure that the crop material is prevented from hanging up and hence the recess 41 at the junction between the outer edges of the sheet 35 and the sheet 33.

Figure 2:
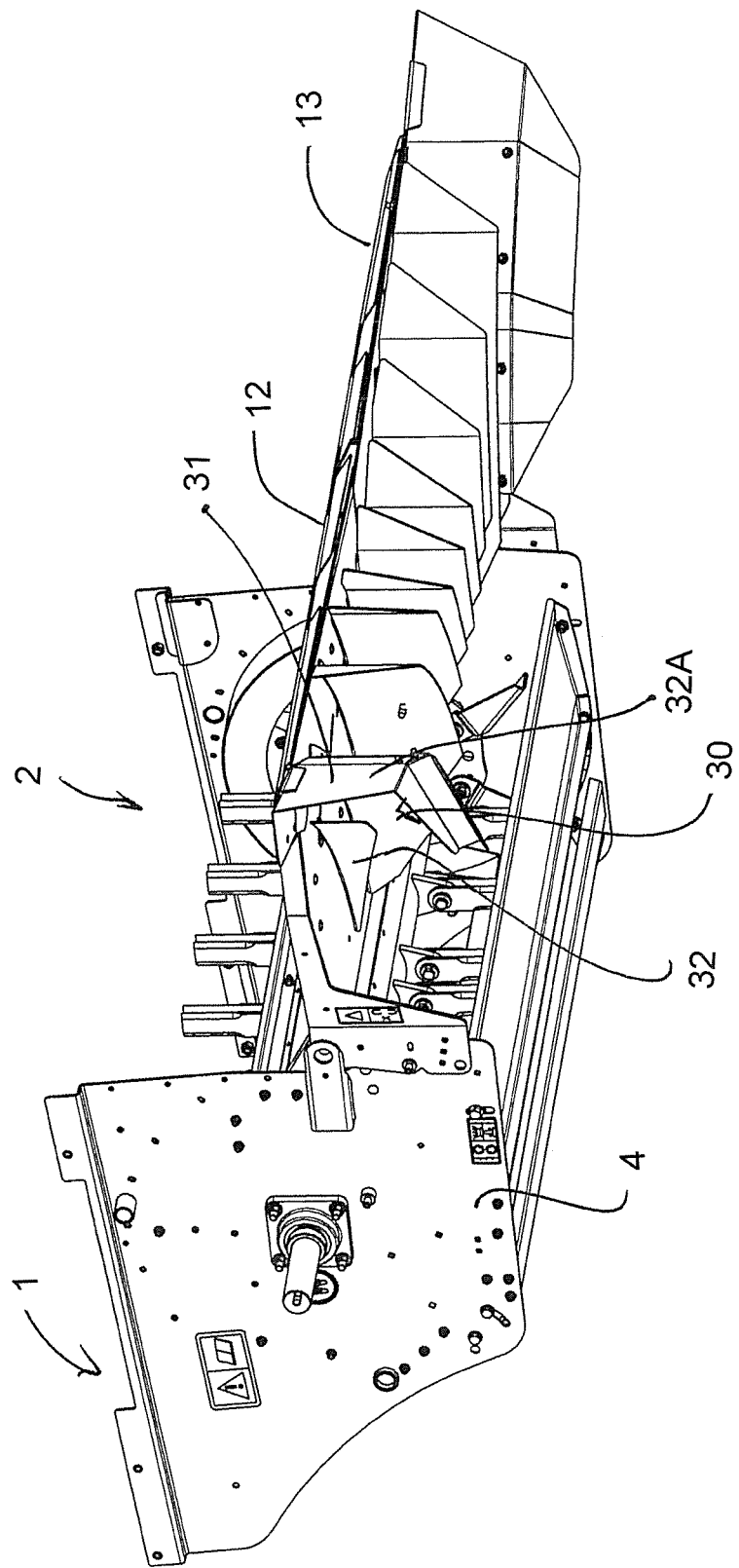
FIG. 2 is an isometric view of the components of FIG. 1 from the same side and below.

The two fins 31 and 32 are separate from one another and adjustably mounted on the tailboard. Each fin is mounted and pivots about a front mounting hole. Thus both fins 31 and 32 can be adjusted as previously described so that its forward end forms a pivot and its rearward end can be moved side to side in slots 16 (FIG. 2). A link connects the fin 32 to the next fin 31 so that these fins are adjustable in common movement. The link 36 however only connects the outermost fin 32 to the next adjacent fin 31 and there is no further linkage to any of the remaining fins. The link is merely a simple connection with no ability to effect adjustment of any of the fins except to control the common movement between the two fins 32 and 31.

Thus the outer two most fins 30 on each side of the tailboard assemblies are configured to focus the high velocity air stream generated by the fan end rotor 26 on the chopped residue. The acceleration of the residue provides a wide spread under adverse side wind conditions. The outer two fins consist of the large fin 31 that carries and directs most of the residue and the smaller fin 32 that alters the direction of the high velocity air to provide a tangential thrust on the larger fin and greater residue acceleration.

The outermost small fin 32 on the tailboard is used to redirect the highest velocity air into a tangential vector with the rear end of next adjacent or second large fin 31. This provides the greatest acceleration of material and the most efficient use of the force available with the high velocity air. If the small fin 32 was removed the high velocity air would crash into fin 31 and bounce off of the fin taking material with it, most likely landing beside the chopper. The intention is to slowly turn the high velocity air and apply its energy to the residue. Surfaces 33 and 35 are attached to fin 31 so that the air, that is reflected off of the residue when being accelerated, is held captive and can not bounce off in another direction. More of the energy in the air is used to accelerate the residue than without these surfaces present. Adding surface 33 has a huge impact on the retained air velocities. In the field, removal of the surface 33 reduces the spread width by 25%.

The residue primarily travels on the vertical fin surface 35, however conditions exist with tough, green straw where the residue discharged from the chopper does not flow easily and will contact the other surfaces. Surface 33 serve to contain and focus the air on the residue stream. Outer surface 33 is primarily used to contain the air that is being reflected from surfaces 35. The small fin 32 is positioned to direct the high velocity air tangentially on to the rear end of fin surface 35 of large fin 31. The relative position of the two fins 31 and 32 is maintained in an optimum tangential relationship with link 36. Adjustment of the two fins is available without the need to tune the relative fin positioning.

The large fin 31 is constructed so that plugging is minimized. In tough field conditions heavy, wet residue is discharged down the leading edge 40 of fin surface 35. The adjoining surface must start approximately 0.5 inch behind the previous surface, as indicated at 41. This enables any residue traveling down the leading edge to clear the next surface, and therefore avoids plugging situations. The fin 32 has a passive leading edge since high velocity air must be able to pass by all surfaces, keeping the tough sticky residue moving.

Figure 5:
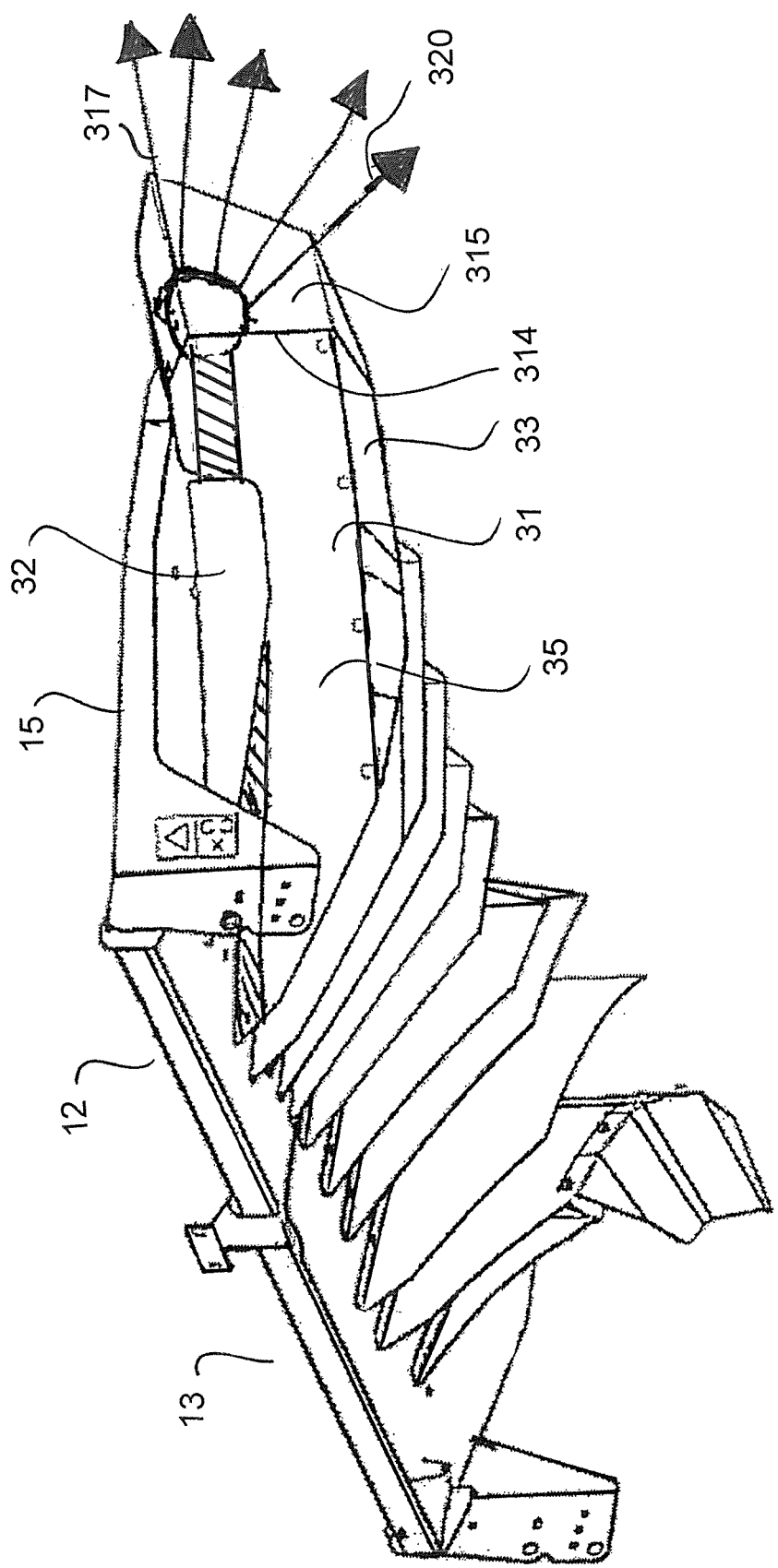
FIG. 5 is an isometric view from one side and below showing the stream of residue material as it impacts on the rear inclined portion of the guide fin.

Turning now to FIGS. 5, 6 and 7 the arrangement is further detailed in which at least two of the guide fins 31 attached by a flange 311 to the guide surface of the tailboard includes a first leading surface portion 312 along which the residue passes extending from a leading edge 313 to a rear end 314 of the leading portion. The fin 31 further includes a trailing portion 315 along which the residue passes after the residue leaves the leading portion 312 at its rear end 314. The fin extends to a trailing edge 316 of the trailing portion 315 spaced downstream of the leading portion 312 from which the residue leaves the guide fin for spreading.

The leading portion 312 is curved smoothly and constantly from its leading edge 313 up to the end 314 of the leading portion at the trailing portion 315 so that the side surface of the leading portion 312 over which the residue slides is concave.

The trailing portion 315 intersects with the leading portion 312 at the end 314 which defines a change in direction where the side surface at the trailing portion is arranged at an angle A to the leading portion 312.

The intersection at the end 314 of the forms a sharp change in direction. For example where the fin is formed of sheet metal, the change in direction between the leading and trailing portions is defined by a defined bend in the sheet metal. Thus the defined bend at the intersection 314 lies along a line substantially at right angles to the path of residue along the leading portion which thus lies along a line substantially across the leading portion at right angles to the tailboard surface. The trailing portion 315 thus extends across and intersects with a path of the residue as it passes along the concave side surface at the leading portion and leaves the end 314 of the leading portion 312.

The trailing portion 315 is planar or flat as best visible in FIG. 6. In this way as best shown in FIG. 7, the residue stream at the intersection 314 impacts on the surface of the portion 315 and is caused to spread downwardly by that impact to form a wider fan of streams as indicated at 317, 318, 319 and 320. This is intended merely to be illustrative and the streams form a constant fan or material diverted downwardly from the surface of the tailboard 15.

As best shown in FIG. 7, the trailing edge 316 of the trailing portion 315 forms a straight line which is inclined to a line 321 across the trailing portion at right angles to the tailboard surface. In this way, an end 322 of the trailing edge remote from the tailboard surface is upstream of, or closer to the leading edge 313, than an end 323 of the trailing edge at the plane of the tailboard surface. In this way the trailing portion 315 is substantially triangular as defined by its top edge at the tailboard, by its leading edge at the intersection 314 and by its trailing edge 316.

The invention claimed is:

1. A discharge apparatus for spreading residue from a combine harvester comprising:

a tailboard having a tailboard surface across which the residue is directed;

at least one guide fin extending outwardly from the tailboard surface so that a stream of the residue engages one side surface of the at least one guide fin as it passes over the tailboard surface;

the at least one guide fin having a leading surface portion along which the residue passes in a downstream direction, a trailing surface portion along which the residue passes after the residue leaves the leading surface portion and a trailing edge of the trailing surface portion spaced downstream of the leading surface portion from which the residue leaves the at least one the guide for spreading;

the leading surface portion having a concave side surface leading in the downstream direction to a trailing end of the leading surface portion;

the trailing surface portion having a leading end intersecting with the trailing end of the leading surface portion at a line transverse to both the leading surface portion and the trailing surface portion such that the residue leaving the trailing end of the leading surface portion engages onto the trailing surface portion at the line;

the trailing surface portion having a side surface onto which the residue passes from the concave side surface of the leading surface portion which is arranged at an angle greater than 0 degrees to the concave side surface at the trailing end of the leading surface portion so as to define a change of direction at the line;

the trailing surface portion thus extending across and intersecting with a path of the residue as it passes along the concave side surface at the trailing end of the leading surface portion such that the residue impacts on the trailing surface portion at the line;

wherein the angle between the concave side surface of the leading surface portion and the side surface of the trailing surface portion is arranged to cause the stream at the change in direction to spread on the at least one guide fin in a direction outwardly from the tailboard surface;

and wherein the trailing edge of the trailing surface portion is arranged at an angle to a line at a right angle to the tailboard surface so that an end of the trailing edge at the tailboard surface is downstream of an end of the trailing edge remote from the tailboard surface so as to cause multiple release points longitudinally of the guide fin depending on a distance outwardly from the tailboard surface that the material leaves the trailing edge.

2. The discharge apparatus according to claim 1 wherein the trailing surface portion is planar.

3. The discharge apparatus according to claim 1 wherein the at least one guide fin is formed of sheet metal and the change in direction between the leading surface portion and the trailing surface portion is defined by a defined bend in the sheet metal.

4. The discharge apparatus according to claim 1 wherein the line extends substantially at a right angle to the tailboard surface.

5. The discharge apparatus according to claim 1 wherein the angle at the change in direction is greater than 0 degrees up to 45 degrees.

6. The discharge apparatus according to claim 1 wherein the angle at the change in direction lies between 5 degrees up to 30 degrees.

7. The discharge apparatus according to claim 1 wherein the trailing edge of the trailing surface portion is inclined so that the end of the trailing edge remote from the tailboard surface is closely adjacent the line so that the trailing surface portion is substantially triangular.

8. A method for spreading residue from a combine harvester comprising:

directing a stream of the residue across a tailboard surface of a tailboard;

engaging the stream of the residue against one side surface of at least one guide fin as it passes over the tailboard surface where the at least one guide fin extends outwardly from the tailboard surface;

the at least one guide fin having a leading surface portion along which the residue passes in a downstream direction, a trailing surface portion along which the residue passes after the residue leaves the leading surface portion and a trailing edge of the trailing surface portion spaced downstream of the leading surface portion from which the residue leaves the at least one guide fin for spreading;

the leading surface portion having a concave side surface leading in the downstream direction to a trailing end of the leading surface portion;

the trailing surface portion having a leading end intersecting with the trailing end of the leading surface portion at a line transverse to both the leading surface portion and the trailing surface portion;

causing the stream of residue leaving the trailing end of the leading surface portion to engage onto the trailing surface portion at the line;

arranging a side surface of the trailing surface portion onto which the stream of residue passes from the concave side surface of the leading surface portion at an angle greater than 0 degrees to the concave side surface at the trailing end of the leading surface portion so as to define a change of direction at the line;

causing the residue to impact on the trailing surface portion at the change in direction;

causing the stream at the change in direction to spread on the at least one guide fin in a direction outwardly from the tailboard surface;

arranging the trailing edge of the trailing surface portion at an angle to a line at a right angle to the tailboard surface so that an end of the trailing edge at the tailboard surface is downstream of an end of the trailing edge remote from the tailboard surface;

and causing multiple release points longitudinally of the guide fin depending on a distance outwardly from the tailboard surface that the material leaves the trailing edge.

9. The method according to claim 8 wherein the trailing surface portion is planar.

10. The method according to claim 8 wherein the at least one guide fin is formed of sheet metal and the change in direction between the leading surface portion and the trailing surface portion is defined by a defined bend in the sheet metal.

11. The method according to claim 8 wherein the line extends substantially at a right angle to the tailboard surface.

12. The method according to claim 8 wherein the angle at the change in direction is greater than 0 degrees up to 45 degrees.

13. The method according to claim 8 wherein the angle at the change in direction lies between 5 degrees up to 30 degrees.

14. The method according to claim 8 wherein the trailing edge of the trailing surface portion is inclined so that the end of the trailing edge remote from the tailboard surface is closely adjacent the line so that the trailing surface portion is substantially triangular.

* * * * *